US007278666B2

(12) United States Patent
Hohendorn (10) Patent No.: US 7,278,666 B2
(45) Date of Patent: Oct. 9, 2007

(54) TRUCK BUMPER APPARATUS

(75) Inventor: Peter Hohendorn, Waterloo (CA)

(73) Assignee: Dieters Metal Fabricating Limited, Waterloo, Ontario ( * ) Notice: Subject to any disclaimer, the term of this patent is extended or adjusted under 35 U.S.C. 154(b) by 0 days.

(21) Appl. No.: 11/186,950

(22) Filed: Jul. 22, 2005

(65) Prior Publication Data

US 2007/0018466 A1    Jan. 25, 2007

(51) Int. Cl.
*B60R 19/02* (2006.01)
*B60R 19/24* (2006.01)
*B60R 19/03* (2006.01)

(52) U.S. Cl. .................. 293/102; 296/121; 296/155

(58) Field of Classification Search ............... 293/121, 293/102, 155
See application file for complete search history.

(56) References Cited

U.S. PATENT DOCUMENTS

| | | | |
|---|---|---|---|
| 1,235,728 A | 8/1917 | Sager | |
| 1,325,734 A | 12/1919 | Lyon | |
| 1,421,606 A | 7/1922 | Strickland | |
| 3,116,083 A | 11/1963 | Whitlow | |
| 3,427,063 A | 2/1969 | Taylor | |
| 4,322,106 A | 3/1982 | Nespor | |
| 4,372,701 A | 2/1983 | Watanabe | |
| 4,634,168 A * | 1/1987 | Fuchs et al. | ............... 296/35.1 |
| 4,674,782 A * | 6/1987 | Helber | ...................... 293/106 |
| 4,877,279 A | 10/1989 | Logan | |
| 4,961,603 A | 10/1990 | Carpenter | |
| 5,066,057 A | 11/1991 | Furuta et al. | |
| 5,123,688 A | 6/1992 | Takado et al. | |
| 5,150,935 A * | 9/1992 | Glance et al. | ............. 293/136 |
| 5,277,465 A | 1/1994 | Weir | |
| 6,325,430 B1 | 12/2001 | King | |
| 2001/0038213 A1 | 11/2001 | Fox et al. | |
| 2004/0217607 A1 | 11/2004 | Bladow et al. | |

* cited by examiner

*Primary Examiner*—Dennis H. Pedder
(74) *Attorney, Agent, or Firm*—Timothy J. Sinnott (57) ABSTRACT

A truck bumper apparatus includes an elongated bumper member sized to extend across a truck and a support member for supporting the bumper member. The bumper member comprises an elongated bumper plate free of apertures for fastening the bumper member to the truck. The support member comprises a mounting plate having fastening apertures for mounting the support member to a truck frame. The bumper member has bumper flanges extending perpendicularly from the side edges of the bumper plate, the bumper flanges having at least two bumper apertures. The support member has support flanges extending perpendicularly from side edges of the mounting plate, the support flanges having support apertures spaced to register with the bumper apertures. The mounting plate has sets of fastening apertures for mounting the support member to at least two different makes of trucks having frames with different patterns of existing apertures for mounting a bumper thereto.

19 Claims, 6 Drawing Sheets

TRUCK BUMPER APPARATUS

FIELD OF THE INVENTION

The present invention relates to truck bumpers, and in particular, to aftermarket bumpers for heavy trucks such as semi-trailer trucks.

BACKGROUND OF THE INVENTION

Semi-trailer trucks are manufactured with bumpers that are attached to the frame of the truck in different ways, depending on the make of the truck. In the case of most OEM (Original Equipment Manufacturer) truck bumpers, the bumper is attached to the frame of the truck by bolts that extend through apertures in the bumper into the frame. In the case of these bumpers, the heads of the bolts protrude from the front surface of the bumpers, and are clearly visible from the front of the truck. Since the frames for most makes of semi-trailer trucks have different configurations, the pattern of apertures in these OEM bumpers tends to be different for each make of truck.

Semi-trailer trucks are also provided with a variety of different towing devices, with some makes of trucks having a tow hook extending from the middle of the frame, and others having towing devices extending from each side of the frame. Most OEM truck bumpers have tow holes that provide access to these towing devices, while some bumpers also have access plates that cover the tow holes.

The presence of bumper bolts and tow holes tends to detract from the appearance of standard OEM bumpers. In the opinion of many truckers, standard OEM truck bumpers are not particularly attractive.

It is possible to improve the appearance of standard OEM truck bumpers by polishing or chrome plating the front surface of the bumpers, thereby creating a reflective or mirror finish. However, the bolt heads and tow holes visible on OEM truck bumpers tend to detract from this finish. Chrome plating around apertures is also prone to fractures that can cause corrosion, which further detracts from the appearance of the bumpers.

Consequently, there has developed a demand for custom or aftermarket truck bumpers having a more attractive appearance than standard OEM truck bumpers, and in particular, for truck bumpers having a reflective or mirror finish.

Some attempts have been made to make an aftermarket truck bumper that satisfies this demand. For example, U.S. Pat. No. 6,325,430 to King discloses a laminated truck bumper comprising an outer sheet of stainless steel configured into a generally U-shaped elongated bumper channel that does not have any holes in its front, top or bottom surfaces, a reinforcing sheet welded into the front bumper channel, and studs welded into indentations in the reinforcing sheet for attaching the bumper to the frame of a truck. However, the King truck bumper requires a relatively complex manufacturing process involving lamination and welding, which has cost disadvantages. The King bumper is also difficult to service, as it is necessary to cut the welds between the outer sheet and the reinforcing sheet to replace the studs. Furthermore, the King bumper is configured to fit only one make of truck.

Accordingly, there is a need for an improved aftermarket truck bumper that does not have the disadvantages associated with prior art bumpers, and in particular, for an improved aftermarket bumper having a mirror finish unmarred by bolt heads or tow holes, that can be readily mounted onto several different makes of trucks.

SUMMARY OF THE INVENTION

The present invention is directed to a truck bumper apparatus comprising an elongated bumper member sized to extend across a truck and a support member shaped for supporting the bumper member. The support member comprises an elongated mounting plate having fastener apertures therein for fastening the support member onto at least two different types of trucks, each of the different types of trucks having a frame with a different pattern of existing apertures therein for mounting a bumper thereto. The fastener apertures preferably comprise at least two different sets of fastener apertures, each of the different sets of fastener apertures being located to register with the pattern of existing apertures in the frame of one of the at least two different types of trucks. The bumper member and the support member comprise fastening means for fastening the bumper member to the support member after the support member is mounted onto the truck.

The bumper member preferably comprises an elongated bumper plate having bumper flanges extending perpendicularly from side edges thereof. The support member preferably comprises a support bracket shaped to fit between the bumper flanges having support flanges extending perpendicularly from side edges thereof. The bumper plate preferably has a front surface free of any apertures for fastening the bumper member onto the truck. The fastening means preferably comprises bumper apertures in the bumper flanges and support apertures in the support flanges, the support apertures being spaced to register with the bumper apertures, the flange apertures being sized to receive fasteners for fastening the bumper flanges to the support flanges.

The present invention is also directed to truck bumper apparatus comprising an elongated bumper member sized to extend across a truck having a frame, and a support member for supporting the bumper member. The bumper member comprises an elongated bumper plate, the bumper plate being free of apertures for fastening the bumper member to the frame of the truck. The support member comprises a support bracket sized to fit between the bumper flanges. The support bracket comprises an elongated mounting plate for mounting the bumper member to the frame of the truck. The mounting plate has fastener apertures therein sized to receive fasteners, the fastener apertures being located to register with existing apertures in the frame of the truck for mounting a bumper thereto. The bumper member comprises bumper flanges extending perpendicularly from side edges of the bumper plate, and the support bracket comprises support flanges extending from side edges of the mounting plate. The bumper flanges have bumper apertures therein and the support flanges have support apertures therein. The bumper apertures register with the support apertures when the bumper member is placed onto the support member. The bumper apertures and the support apertures are sized to receive fasteners for fastening the bumper member to the support member.

BRIEF DESCRIPTION OF THE DRAWINGS

The invention will now be described, by way of example only, with reference to the following drawings, in which.

DETAILED DESCRIPTION OF THE INVENTION

Figure 1:
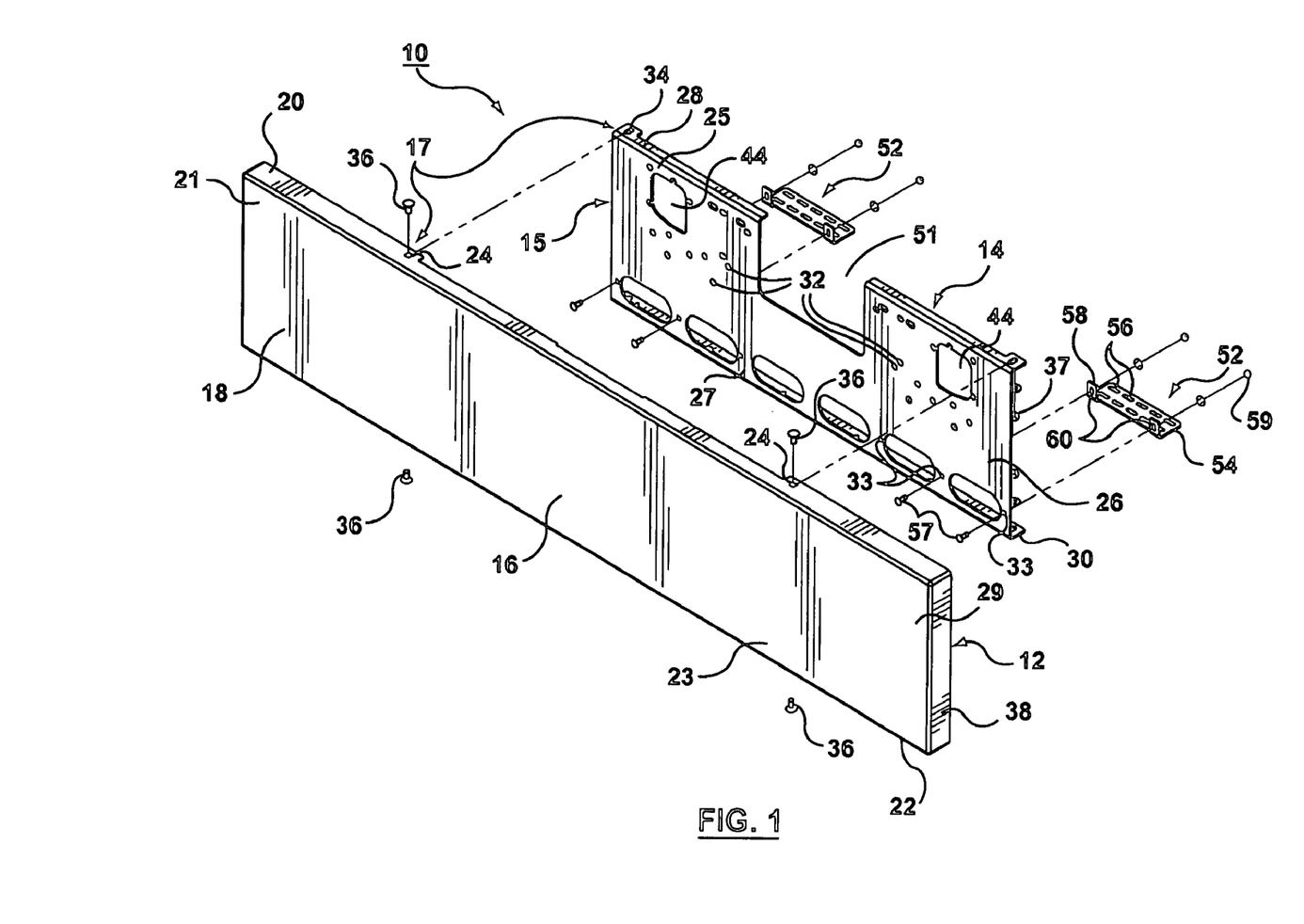
FIG. 1 is an exploded perspective view of truck bumper apparatus made in accordance with a preferred embodiment of the present invention.
Figure 2:
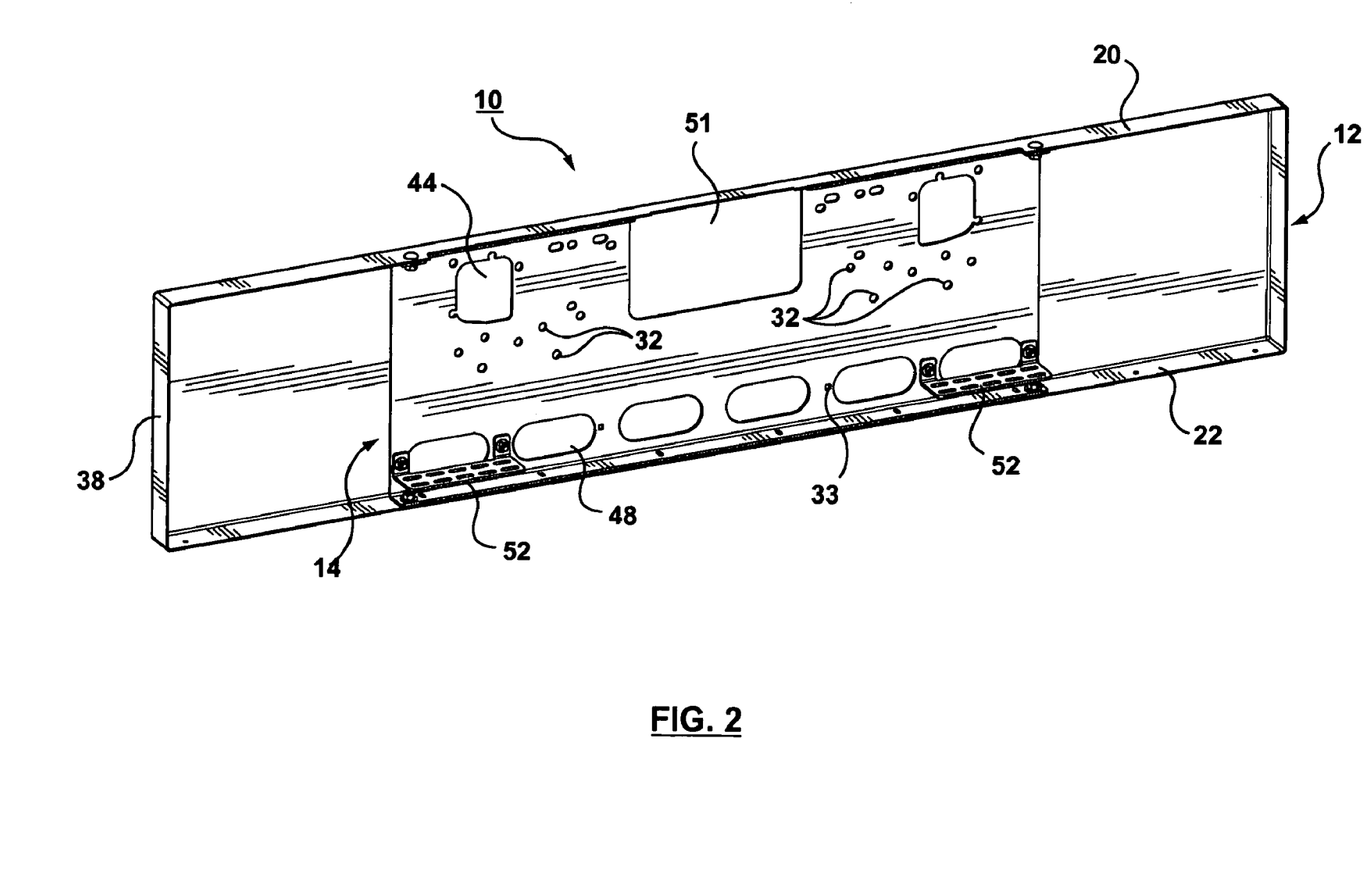
FIG. 2 is a rear perspective view of the truck bumper apparatus of the present invention shown as if the subject apparatus were mounted onto the frame of a truck.
Figure 3:
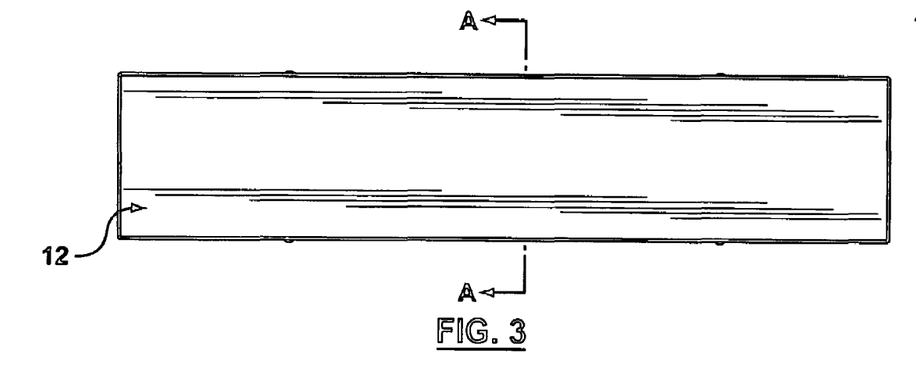
FIG. 3 is a front elevational view of the truck bumper apparatus shown in FIG. 2.
Figure 4:
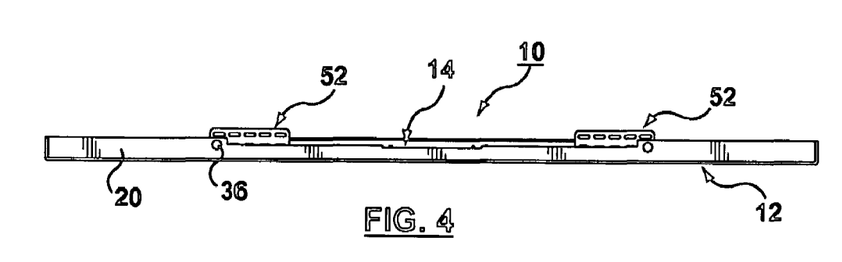
FIG. 4 is a top plan view of the truck bumper apparatus shown in FIG. 2.
Figure 5:
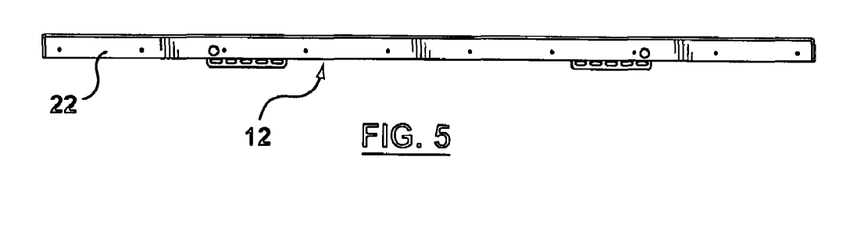
FIG. 5 is a bottom plan view the truck bumper apparatus shown in FIG. 2.
Figure 6:
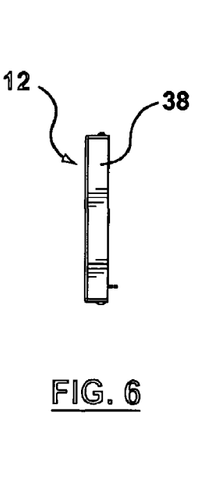
FIG. 6 is a side elevational view of the truck bumper apparatus shown in FIG. 2.
Figure 7:
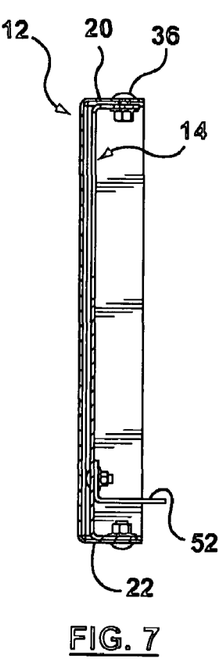
FIG. 7 is a sectional view of the truck bumper apparatus taken along line A-A in FIG. 3.

Referring to FIG. 1, illustrated therein is truck bumper apparatus 10 made in accordance with a preferred embodiment of the subject invention. Truck bumper apparatus 10 is adapted to be mounted to the front of a truck, typically a heavy truck, such as a class 8 semi-trailer truck. Truck bumper apparatus 10 comprises an elongated bumper member 12 sized to extend across a truck, and support member 14 shaped for supporting bumper member 12.

Bumper member 12 preferably comprises an elongated bumper plate 16 having a front surface 18, a top bumper flange 20 extending perpendicularly from top side edge 21 of bumper plate 16, and a bottom bumper flange 22 extending perpendicularly from bottom side edge 23 of bumper plate 16. The front surface 18 of bumper plate 18 is preferably free of any apertures for fastening bumper member 12 to the frame of a truck. The top bumper flange 20 and the bottom bumper flange 22 each have at least two spaced bumper apertures 24 for attaching bumper member 12 to support member 14.

Support member 14 is preferably a support bracket 15 shaped to fit between the top bumper flange 20 and the bottom bumper flange 22. Support bracket 15 comprises a mounting plate 26, top support flange 28 extending perpendicularly from top side edge 25 of mounting plate 26, and bottom support flange 30 extending perpendicularly from bottom side edge 27 of the mounting plate 26. Mounting plate 26 has a variety of apertures therein, including fastener apertures 32 for fastening support member 14 to the frame of a truck, tow-hole cut-outs 44 and 51, optional light cut-outs 48, and bracket apertures 33, all of which are described in more detail hereinbelow.

Bumper member 12 and support member 14 are provided with fastening means 17 for fastening bumper member 12 onto support member 14 after support member 14 is mounted onto a truck. Fastening means 17 comprises bumper apertures 24 in bumper flanges 20, 22 and support apertures 34 in support flanges 28, 30 that are spaced to register with bumper apertures 24 when bumper member 14 is placed onto support member 14. Support apertures 34 and bumper apertures 24 are sized to receive fasteners such as carriage bolts 36 and nuts 37 for fastening bumper member 12 onto support member 14.

In the preferred embodiment, bumper member 12 may include end bumper flanges 38 that extend perpendicularly from end edges 29 of bumper plate 16. End bumper flanges 38 are welded or otherwise rigidly coupled to top bumper flange 20 and bottom bumper flange 22.

Truck bumper apparatus 10 may further comprise a pair of auxiliary brackets 52 that can be used to connect support member 14 to bumper braces (not shown) depending from the frames of some makes of trucks. Auxiliary brackets 52 are optional, in that support member 14 provides sufficient stiffness to adequately support bumper member 14. Auxiliary brackets 52 comprise a plate 54 with two rows of slots 56 therein, and flanges 58 having apertures 60. Auxiliary brackets 52 are attached to support member 14 by fasteners such as bolts 57 that extend through bracket apertures 33 of support member 14 and nuts 59. A plurality of slots 56 allows auxiliary brackets 52 to be mounted to the braces of various different makes of trucks.

Referring to FIGS. 2-7, bumper apparatus 10 is shown therein with auxiliary brackets 52 attached to support member 14, and with bumper member 12 fastened to support member 14, as if bumper apparatus 10 were mounted to the frame of a truck. It should be understood, however, that this is for illustrative purposes only, and that bumper member 12 is typically not fastened to support member 14 until after support member 14 mounted onto the frame of a truck.

Figure 8:
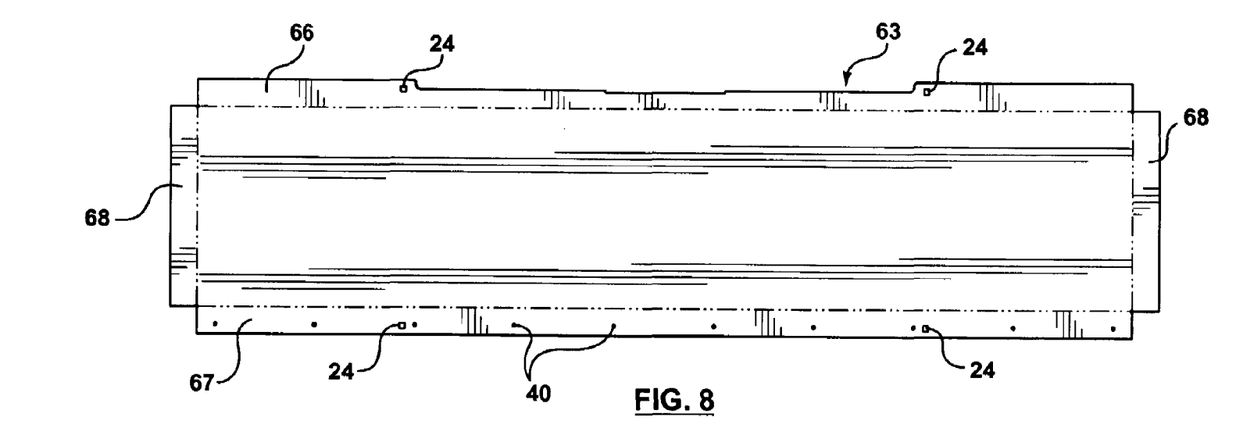
FIG. 8 is a flat layout view of a bumper blank shaped to form the bumper member of the present invention.

Referring now to FIG. 8, bumper member 12 is preferably made by a process that comprises the step of laser cutting a sheet of steel, preferably 11-gauge steel, into a flat bumper blank 63 shaped for forming bumper member 12. Various apertures, including bumper apertures 24 are then drilled in top side portion 66 and bottom side portion 67 of bumper blank 63. Bumper apertures 24 are preferably square to mate with the square portion of carriage bolts. Optionally, accessory mounting apertures 40 may be drilled in the bottom side portion 67 for mounting truck accessories such as under bumper light bars and license plate holders. Top and bottom side portions 66 and 67, and end portions 68 are then bent, perpendicularly to the bumper plate 16, to form top bumper flange 20, bottom bumper flange 22, and end bumper flanges 38. End bumper flanges 38 are then welded to the top bumper flange 20 and bottom bumper flange 22.

In the preferred embodiment of the invention, bumper member 12 is constructed of stainless steel, and the front surface is finished with a reflective finish such as an American Iron and Steel Institute (AISI) No. 2B, 2BA, 4, 7 or 8 finish, with the preferred finish being a highly reflective or mirror-like finish such as the No. 7 or 8 AISI mirror finish. Stainless steel is a preferred material, as bumpers made from stainless steel are more resistant to corrosion than bumpers made from most other steels. Alternatively, bumper member 12 could be constructed of mild steel and chrome plated to create a highly reflective finish. The chrome plating process is preferably carried out after the steel sheet has been laser cut, drilled, and bent so as to reduce chrome plate fracture.

Figure 9:
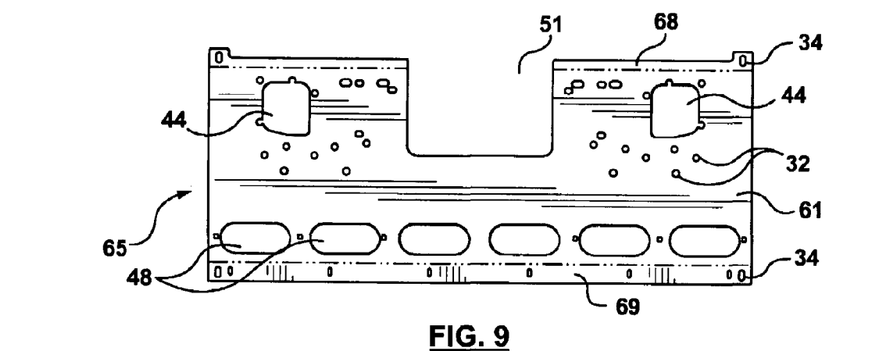
FIG. 9 is a flat layout view of a support member blank shaped to form the support member of the present invention.

Referring now to FIG. 9, support member 14 is typically constructed from a steel sheet, preferably ³⁄₁₆ inch thickness steel, and preferably mild steel and that is powder coated black. The process of manufacturing the support member 14 involves the step of laser cutting a steel sheet into a flat support member blank 65 shaped to form support member 14, comprising a plate portion having tow-hole cut-outs 44 and 51, and optional light cut-outs 48. Fastener apertures 32 are drilled in plate portion 61 of support member blank 65, and support apertures 34 are drilled top portion 68 and bottom portion 69 of support member blank 65. Support apertures 34 in top and bottom portions 68, 69 are preferably formed in the shape of slots. Top and bottom portions 68, 69 are then bent, preferably perpendicular to the mounting plate 26 to form top support flange 28 and bottom support flange 30 of support member 14.

Figure 10:
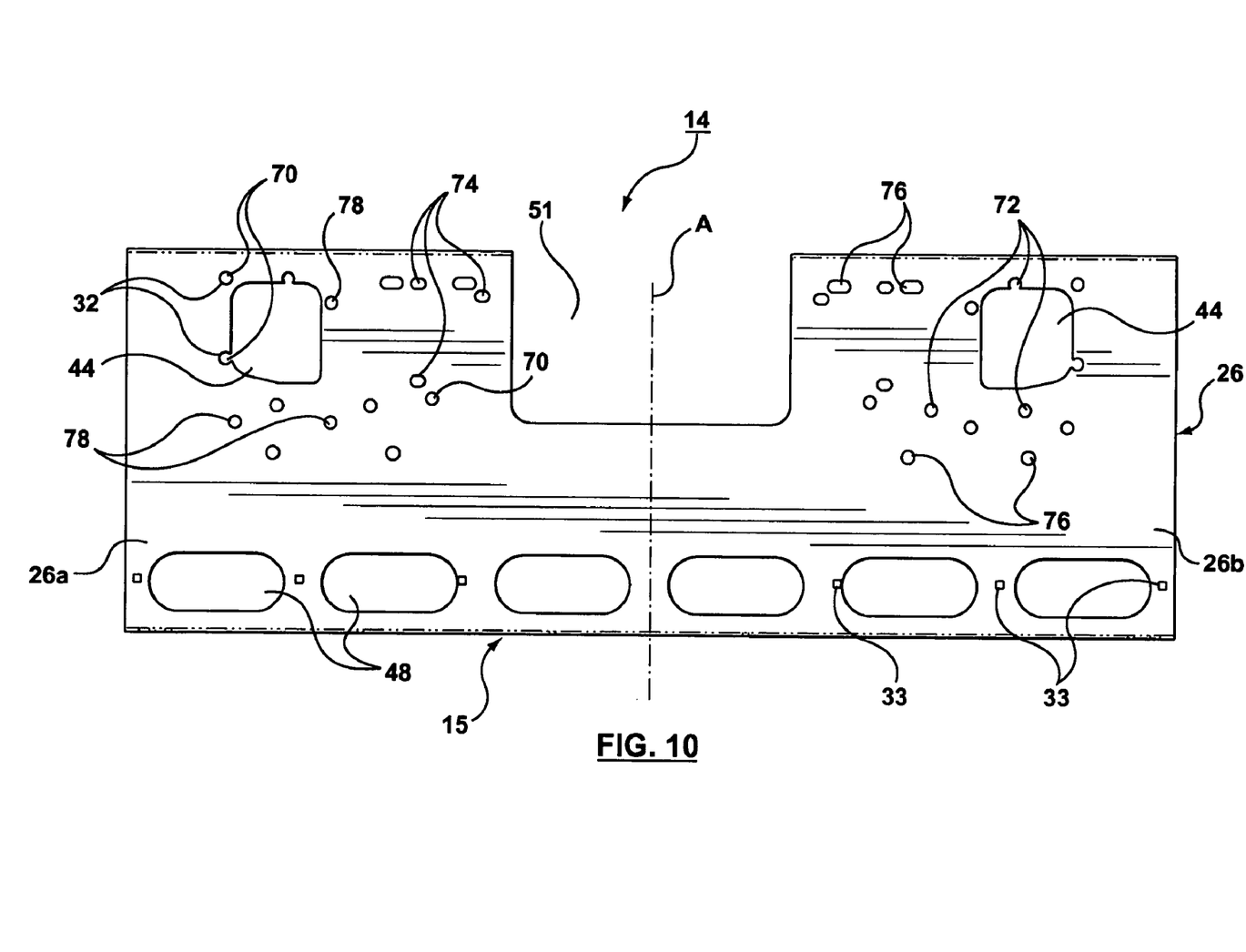
FIG. 10 is a front elevational view of the support member of the present invention.

Referring now to FIG. 10, support member 14 is preferably a "universal fit" support bracket 15 that can be mounted onto several different types of trucks having frames with different patterns of existing apertures for mounting a bumper thereto. Support bracket 15 comprises mounting plate 26 having several different sets of fastener apertures located to register with existing bumper apertures in the frames of several different makes of trucks. As shown in FIG. 10, mounting plate 26 has five sets of fastener apertures, a first set of fastener apertures 70 that register with existing bumper apertures in the frames of Kenworth W900 trucks from 1982 to date, a second set of fastener apertures 72 that register with existing bumper apertures in the frames of Peterbilt 378 and 379 trucks from 1987 to date, a third set of fastener apertures 74 that register with existing bumper apertures in the frames of Western Star conventional trucks from 1989 to date, a fourth set of fastener apertures 76 that register with existing bumper apertures in the frames of Freightliner Classic trucks, and a fifth set of fastener apertures 78 that register with existing apertures in the frames of International 9900 trucks.

It should be understood that the two halves 26*a*, 26*b* of mounting plate 26 separated by axis A are mirror images of each other, and that for each set of fastener apertures identified in one half of mounting plate 26, there exists a corresponding set of fastener apertures in the other half of mounting plate 26.

Mounting plate 26 also has tow hole cut-outs 44 that allow access to the towing devices for Freightliner, Kenworth, and International trucks, and central tow hole cut-out 51 that allows access to the tow hooks for Peterbilt, Freightliner and Western Star trucks. Mounting plate 26 further includes light cut-outs 48 that provide clearance for the fixtures of oval lights that may be mounted on and protrude through bumper member 12.

Bumper members 12 are preferably made in three standard heights, 18", 20" and 22", to replace OEM truck bumpers having these heights. Bumper member 12 has a standard width of approximately 94", so as to extend across standard width semi-trailer trucks. However, it should be understood that the width of bumper member 12 could be modified to fit trucks of non-standard widths.

Support member 14 also comes in three standard heights having outside dimensions that are slightly less than 18", 20", and 22", respectively, so as to fit within the inside dimensions of bumper flanges 20, 22 of each of the standard height bumper members 12. Support member 14 preferably has a width of about 54", as it has been determined that a support member of this width provides sufficient stiffness for bumper members 12 having a standard width of about 94".

To mount truck bumper apparatus 10 onto a truck frame, auxiliary brackets 52 are attached to support member 14 using the appropriate set of apertures 33. Support member 14 is then mounted to the frame of the truck, by aligning the appropriate set of fastening apertures 70, 72, 74, 76 or 78 in mounting plate 26 with existing bumper apertures in the frame of the truck, and rigidly securing mounting plate 26 to the frame using fasteners such as bolts and nuts. Auxiliary brackets 52 are then attached to bumper braces depending from the frame of the truck. Once support member 14 is rigidly mounted on the truck frame, bumper member 12 can be attached to support member 14 by aligning bumper flange apertures 24 with support flange apertures 34 and securing with fasteners, such as carriage bolts 36 and nuts 37.

Should a truck having bumper apparatus 10 mounted thereon require towing, bumper member 12 can be removed from support member 14 by unfastening carriage bolts 36, allowing a tow cable to be inserted through tow hole cut-outs 44 or cut-out 51, thereby coupling the truck to the tow truck, without having to remove support member 14 from the frame of the truck.

Front surface 18 of bumper plate 16 and the outside surface of end bumper flanges 38 of bumper member 12 of the preferred embodiment of the invention are uniform and free of any apertures for fastening bumper apparatus 10 to the, frame of a truck. Bumper member 12 accordingly has a simple and uniform visual appearance that is free from unsightly fasteners. This construction also provides a uniform reflective surface and eliminates stray and hazardous reflections from fasteners and aperture edges. In addition, this uniform surface further inhibits the formation of corrosion that could weaken the structural integrity of the bumper and distracts from its visual appearance.

Figure 11:
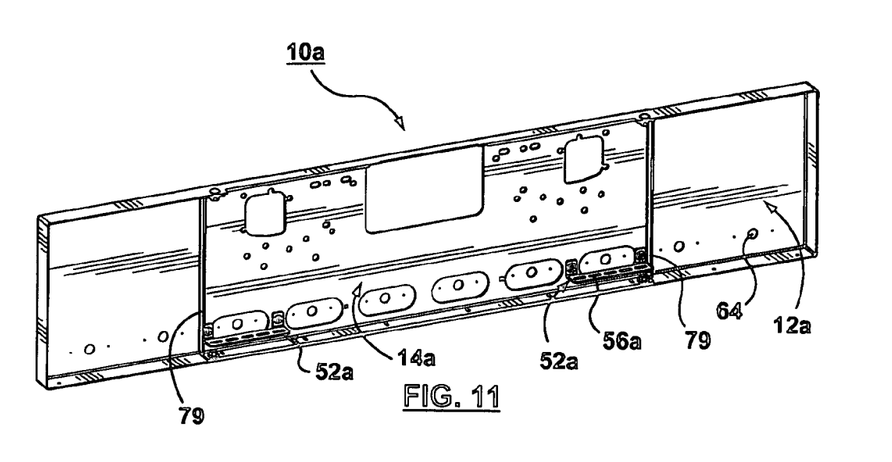
FIG. 11 is a rear perspective view of truck bumper apparatus made in accordance with an alternative embodiment of the present invention.
Figure 12:
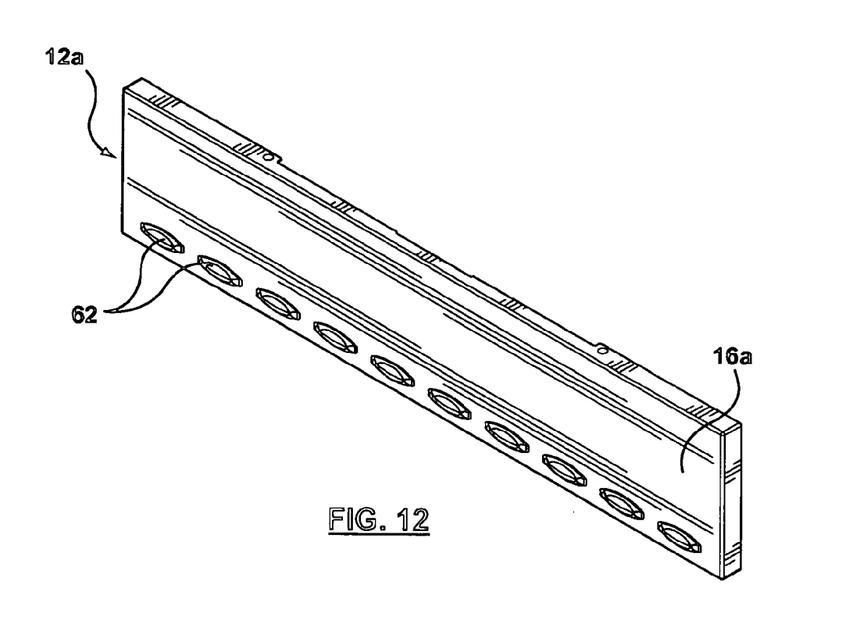
FIG. 12 is a front perspective view of the truck bumper apparatus shown in FIG. 11.

Referring now to FIGS. 11 and 12, illustrated therein is bumper apparatus 10*a* made in accordance with an alternative embodiment of the present invention, comprising bumper member 12*a* and support member 14*a*. Bumper member 12*a* is similar to bumper member 12 of the preferred embodiment, except that bumper member 12*a* comprises bumper plate 16*a* having a plurality of bumper light apertures 64 for receiving bumper lights 62. Bumper lights 62 improve night and fog driving conditions and are also used to enhance cosmetic appearance of the bumper member 12. When bumper lights 62 are installed, portions of bumper lights 62 protrude through bumper light apertures 64 on the bumper plate 16, and light cut-outs 48 of support member 14*a* provide clearance for these portions, and enable the wiring for lights to be readily connected to the electrical components of the truck.

Support member 14*a* is similar to support member 14 of the preferred embodiment, except that support member 14*a* comprises end flanges 79 extending perpendicularly from the end edges of support member 14*a*. End flanges 79 increase the stiffness of support member 14*a* and make it possible for support member 14*a* to be made of a thinner gauge steel sheet, thus saving weight. Auxiliary brackets 52*a* are similar to auxiliary brackets 52 of the preferred embodiment, except that each of auxiliary brackets 52*a* has a single row of slots 56*a*.

The present invention reduces the cost of manufacturing aftermarket truck bumpers for different makes of trucks, since a single support member 14 fits a variety of different makes of trucks. It is also less expensive and more convenient for maintaining spare parts because it is not necessary to carry a large inventory of different types of support members for different makes of trucks. Bumper replacement costs for truck owners may also be less expensive because in many cases only bumper member 12 will need to be replaced.

Truck bumper apparatus 10 of the present invention is less expensive to manufacture than prior art aftermarket truck bumpers that require extensive welding. The only welding which is optional for the manufacture of the truck bumper apparatus 10 is the welding of the bumper side flanges 38 to bumper flanges 20, 22.

The use of fasteners to attach bumper member 12 to the support member 14 further provides advantages over prior art bumper constructions that comprise a inner support member welded to a outer member. Should bumper member 12 become damaged or any fasteners require replacement, bumper member 12 can easily removed from support member 14 without cutting any welds, by simply removing the bolts from bumper apertures 24, which are directly accessible from the front of the truck.

The bumper apparatus 10 of the present invention accordingly provides a strong and practical means for attaching a bumper to a truck while at the same time providing a bumper having a front surface clear of any unsightly fasteners or apertures for fasteners.

While the preferred and alternative embodiments of the bumper apparatus of the present invention depicted herein comprise a flat rectangular bumper plate, it should be understood that the shape of the bumper member could be modified, and in particular, the corner portions of the bumper member could be angled or curved or otherwise contoured to extend around the corners of the truck on which it is mounted. Also, while the preferred embodiment of the mounting plate includes sets of apertures located to fit five major makes of semi-trailer trucks, it should be understood that the mounting plate could be modified to include fastener apertures that fit other makes of semi-trailer trucks, or other types of heavy trucks. The mounting plate could also be modified to include other types of tow hole cut-outs or running light cut-outs.

It should therefore be apparent to one skilled in the art that various modifications can be made to the embodiments disclosed herein, without departure from the invention, the scope of which is defined in the appended claims.

The invention claimed is:

1. Truck bumper apparatus for heavy trucks, comprising:
   (a) an elongated bumper member sized to extend across an end of a heavy truck;
   (b) a support member shaped for supporting the bumper member, the support member comprising an elongated planar mounting plate shaped for extending across a portion of the end of the heavy truck, the mounting plate having plate apertures therein for mounting the support member onto at least two different types of heavy trucks, each of the different types of heavy trucks having a frame with a different pattern of existing frame apertures therein for mounting a bumper thereto, wherein the plate apertures in the mounting plate comprise at least two different sets of plate apertures, each of the different sets of plate apertures being located to register with the pattern of existing frame apertures in the frame of one of the at least two different types of heavy trucks, the plate apertures and the frame apertures being sized to receive plate fasteners for fastening the support member to the frame;
   (c) the bumper member and the support member being provided with fastening means for releasably fastening the bumper member to the support member after the support member is mounted onto the truck, the fastening means being positioned so as to define a space between the mounting plate and the bumper member, the space having a uniform depth sufficient to accommodate the plate fasteners.

2. The apparatus of in claim 1, wherein the least two different sets of fasteners plate apertures comprise five different sets of plate apertures, each of the five different sets of plate apertures being located to register with the pattern of existing frame apertures in the frame of one of five different types of trucks.

3. The apparatus of claim 1, wherein the mounting plate has tow holes therein for providing access to towing devices on the frames of the at least two different types of trucks.

4. The apparatus of claim 1, wherein the mounting plate has a plurality of light apertures therein shaped for providing clearance for bumper light fixtures.

5. The apparatus of claim 1, wherein the bumper member comprises an elongated bumper plate having bumper flanges extending perpendicularly from side edges thereof, and the support member comprises a support bracket shaped to fit between the bumper flanges.

6. The apparatus of claim 5, wherein the support bracket comprises support flanges extending perpendicularly from side edges of the mounting plate, the support flanges being sized to fit between the bumper flanges.

7. The apparatus of claim 6, wherein the fastening means comprises bumper flange apertures in the bumper flanges and support flange apertures in the support flanges, the bumper flange apertures registering with the support flange apertures when the bumper member is placed onto the support member.

8. The apparatus defined in claim 7, wherein the fastening means also comprises flange fasteners sized to fit through the bumper flange apertures and the support flange apertures.

9. The apparatus of claim 5, wherein the bumper plate has a front surface free of apertures for fastening the bumper member to the truck.

10. The apparatus of claim 5, further comprising an auxiliary bracket for connecting the support bracket to braces extending downwardly from the truck frame.

11. Truck bumper apparatus for heavy trucks, comprising:
   (a) an elongated bumper member sized to extend across an end of a heavy truck having a frame, the bumper member comprising an elongated bumper plate, the bumper plate having a front surface free of apertures for fastening the bumper member to the frame of the truck; and
   (b) a support member for supporting the bumper member, the support member comprising a support bracket shaped to extend across a portion of the end of the truck, the support bracket comprising an elongated planar mounting plate for mounting the bumper member to the frame of the truck, the mounting plate having plate apertures therein, the plate apertures being located to register with existing frame apertures in the frame of the truck for mounting a bumper thereto, wherein the plate apertures in the mounting plate comprise at least two different sets of plate apertures for mounting the support member to at least two different makes of trucks having frames with different patterns of existing frame apertures therein for mounting a bumper thereto, the plate apertures being sized to receive plate fasteners for fastening the support member to the frame: and
   (c) wherein the bumper member comprises bumper flanges extending perpendicularly from side edges of the bumper plate, and the support bracket comprises support flanges extending perpendicularly from side edges of the mounting plate, the bumper flanges having bumper apertures therein and the support flanges having support flange apertures therein, the bumper flange apertures registering with the support flange apertures when the bumper member is placed onto the support member after the support member is mounted onto the frame of the truck, the bumper flange apertures and the support flange apertures being sized to receive flange fasteners for releasably fastening the bumper member to the support member, the bumper flange apertures and the support flange apertures being positioned so as to define a space between the mounting plate and the bumper member, the space having a uniform depth sufficient to accommodate the plate fasteners.

12. The apparatus of claim 11, wherein the bumper plate has end bumper flanges extending from ends of the bumper plate, the end bumper flanges being rigidly coupled to the bumper flanges, the end bumper flanges being free of any apertures.

13. The apparatus of claim 11, wherein the bumper flanges comprise a top bumper flange and a bottom bumper flange, the bottom bumper flange having a plurality of accessory mounting apertures therein for attaching truck accessories to the bumper member.

14. The apparatus defined in claim 11, wherein the bumper plate has a plurality of bumper light apertures shaped for receiving running lights, and the mounting plate has a plurality of support light apertures located to register with the bumper light apertures.

15. The apparatus of claim 11, wherein the bumper plate has a front surface, the front surface having a reflective finish.

16. The apparatus of claim 11, wherein the bumper member is made from stainless steel.

17. The apparatus of claim 11, wherein the plate apertures in the mounting plate comprise at least five different sets of plate apertures for mounting the support member to at least five different makes of trucks.

18. The apparatus defined in claim 1, wherein the support member comprises end flanges extending perpendicularly from edges of the mounting plate.

19. Truck bumper apparatus, comprising:

(a) an elongated bumper plate, a top bumper flange extending perpendicular from a top side edge of the bumper plate, and a bottom bumper flange extending perpendicular from a bottom side edge of the bumper plate, the bumper plate having a front surface free of any apertures for fastening the bumper plate to a frame of the truck; and b) a support bracket for supporting the bumper plate, the support bracket being shaped to fit between the top bumper flange and the bottom bumper flange, the support bracket comprising a planar mounting plate, a top support flange extending perpendicularly from a top side edge of the mounting plate, and a bottom support flange extending from a bottom edge of the mounting plate, the mounting plate having fastener plate apertures sized and shaped for mounting the support bracket to at least two different makes of trucks having frames with different patterns of existing frame apertures therein for mounting a bumper thereto, the plate apertures and the frame apertures being sized to receive plate fasteners for fastening the support bracket to the frame; and (c) wherein the top bumper flange and the bottom bumper flange have at least two spaced bumper flange apertures therein, and the top support flange and the bottom support flange have support flange apertures therein, the support flange apertures being spaced to register with the bumper flange apertures the support flange apertures and the bumper flange apertures being sized to receive flange fasteners for attaching the bumper plate to the support bracket, the support flange apertures and the bumper flange apertures being positioned so as to define a space between the mounting plate and the bumper plate, the space having a uniform depth sufficient to accommodate the plate fasteners.

* * * * *